United States Patent
Tsukita et al.

(10) Patent No.: US 7,204,263 B2
(45) Date of Patent: Apr. 17, 2007

(54) FLOW CONTROL METHOD FOR MICRO SYSTEM

(75) Inventors: Shouichirou Tsukita, Kyoto (JP); Takashi Funatsu, Tokyo (JP); Shuichi Shouji, Saitama (JP)

(73) Assignee: Japan Science and Technology Corporation, Saitama (JP)

( * ) Notice: Subject to any disclaimer, the term of this patent is extended or adjusted under 35 U.S.C. 154(b) by 184 days.

(21) Appl. No.: 10/432,897

(22) PCT Filed: Nov. 8, 2001

(86) PCT No.: PCT/JP01/09782

§ 371 (c)(1),
(2), (4) Date: Jul. 15, 2003

(87) PCT Pub. No.: WO02/44823

PCT Pub. Date: Jun. 6, 2002

(65) Prior Publication Data

US 2004/0050436 A1 Mar. 18, 2004

(30) Foreign Application Priority Data

Nov. 29, 2000 (JP) .............................. 2000-362915

(51) Int. Cl.
*E03B 1/00* (2006.01)
*F15B 21/00* (2006.01)
*C01F 1/40* (2006.01)
(52) U.S. Cl. .................... 137/2; 137/807; 137/828; 204/601
(58) Field of Classification Search ............... 137/833, 137/828, 827, 825, 807, 2, 12; 204/600, 204/601
See application file for complete search history.

(56) References Cited

U.S. PATENT DOCUMENTS

| | | | | | |
|---|---|---|---|---|---|
| 5,571,410 | A | * | 11/1996 | Swedberg et al. | ....... 210/198.2 |
| 5,985,119 | A | * | 11/1999 | Zanzucchi et al. | .......... 204/450 |
| 6,103,199 | A | * | 8/2000 | Bjornson et al. | ........... 422/100 |
| 6,499,499 | B2 | * | 12/2002 | Dantsker et al. | ............... 137/1 |
| 6,623,860 | B2 | * | 9/2003 | Hu et al. | ................. 428/411.1 |

FOREIGN PATENT DOCUMENTS

| JP | 51-102226 | 9/1976 |
|---|---|---|
| JP | 58-161010 | 9/1983 |
| JP | 05-180352 | 7/1993 |

OTHER PUBLICATIONS

Y. Shirasaki et al., "A Novel Biomolecule Sorter Using Thermosensitive Hydrogel in Micro Flow System", Micro Toral Analysis Stems, vol. 2, pp. 925-927, 2002 and article thereof.

K. Tashiro et al., "A Particles and Biomolecules Sorting Micro Flow System Using Thermal Gelation of Methyl Cellulose Solution", Micro Total Analysis Systems, pp. 471-473, 2001 and article thereof.

* cited by examiner

*Primary Examiner*—A. Michael Chambers
(74) *Attorney, Agent, or Firm*—Wenderoth, Lind & Ponack, L.L.P.

(57) ABSTRACT

A method of simply controlling the flow of fluid in a micro system without using a complicated value structure, comprising the steps of adding the substance transformed from sol-gel by stimulation to the fluid flowing through the micro flow passage of the micro system, and adding the stimulation to the fluid at a desired position on the micro flow passage to transform the fluid into gel for flow control.

18 Claims, 2 Drawing Sheets

100 μm

FLOW CONTROL METHOD FOR MICRO SYSTEM

This application is a U.S. national stage of International Application No. PCT/JP01/09782 filed Nov. 8, 2001.

TECHNICAL FIELD

The invention of the present application relates to a flow control method in a micro system. More specifically, the invention of the present application relates to an on-off method for a fluid flow in a micro system.

BACKGROUND ART

By the development of the minute processing technique in the semiconductor industry, a micro electrode produced on a silicon or glass substrate is used widely in the analysis appliances such as an electro chemical detector for a liquid chromatography, and a small electrochemical sensor at the medical treatment site. Moreover, in the field of the genome analysis, in order to determine the DNA base sequence, an electrophoresis analysis is executed commonly in a minute micro channel produced on a glass substrate. Also from this view point, production of a micro electrode on a substrate is regarded as extremely important.

Such interest to the micro system is not only limited to the micro electrode but recently, production and development of a micro-total-analysis system ($\mu$-TAS) and a micro react r, in the light of developing the analysis appliances, attracts the attention so that study is promoted actively worldwide. The $\mu$-TAS and the micro reactor have various aspects superior to the conventional devices such as the capability of measurement and analysis with a small amount of a specimen, the portability, the realization of a low cost, or the like. Therefore, a method for introducing various structures onto a substrate is regarded as important and it is discussed more than before.

Therefore, according to the $\mu$-TAS and the micro reactor, minute structures for providing the role of a tube and a valve in an ordinary analysis appliance or chemical reactor, needs to be produced on the substrate. As to the shaping process for a minute flow passage, it is realized by application of the conventional photolithography or etching technique. However, as to the minute valve, it is considered to be difficult to obtain practically usable one.

Since the minute valve is a portion to be driven and it is also a portion to control the flow of a specimen, high durability and accuracy are required. However, a method for providing a minute valve having the durability and accuracy required to the $\mu$-TAS or the micro reactor has not been established. Moreover, since a valve used in an analysis appliance or chemical reactor inevitably has many parts to be the cause of leakage, choking or the like, it's difficult to keep the desired performance.

Then, the invention of the present application has b en achieved in view of the above-mentioned circumstances, and an object thereof is to provide a method for simply controlling the flow of a fluid in a micro system, without using a complicated valve structure, capable of solving the problems in the conventional technique.

DISCLOSURE OF THE INVENTION

The invention of the present application firstly provides, as a solving means for the object, a method for controlling the flow of a fluid in a micro system, comprising the steps of adding a sol-gel transitional substance by stimulation to a fluid flowing in a minute flow passage of a micro system, and applying stimulation to a desired point on the minute flow passage so as to transform the fluid to a gel for flow control.

Moreover, the invention of the present application secondly provides the control method for the flow in a micro system, wherein the stimulation is the temperature change in the above-mentioned first invention, and it thirdly provides the control method for the flow in a micro system, wherein the stimulation is a voltage.

The invention of the present application furthermore provides fourthly a control method for the flow in a micro system, wherein the temperature change is generated by the local irradiation of an infrared ray in the above-mentioned second invention.

The invention of the present application fifthly provides the control method for the flow in a micro system, wherein the sol-gel transitional substance by the stimulation is a methyl cellulose according to any of claims 1 to 4.

Furthermore, the invention of the present application sixthly provides a micro system for controlling the flow of a fluid by the control method for the flow according to any of the first to fifth inventions.

Then, the invention of the present application seventhly provides an apparatus containing the micro system of the sixth invention.

BEST MODE FOR CARRYING OUT THE INVENTION

A method for controlling the flow of a fluid in a micro system according to the invention of the present application is based on the principle of adding a sol-gel transitional substance by stimulation to a fluid flowing in a minute flow passage of a micro system, and applying stimulation locally to a point where at the flow is to be controlled, and thereby gelling the substance in the fluid so as to choke the flow passage or form a new wall in the flow passage so that the flow is stopped, or the flow direction or the flow rate is changed. Moreover, by eliminating the stimulation, the gelled substance becomes again a sol so that the flow is returned to the original state.

Figure 1:
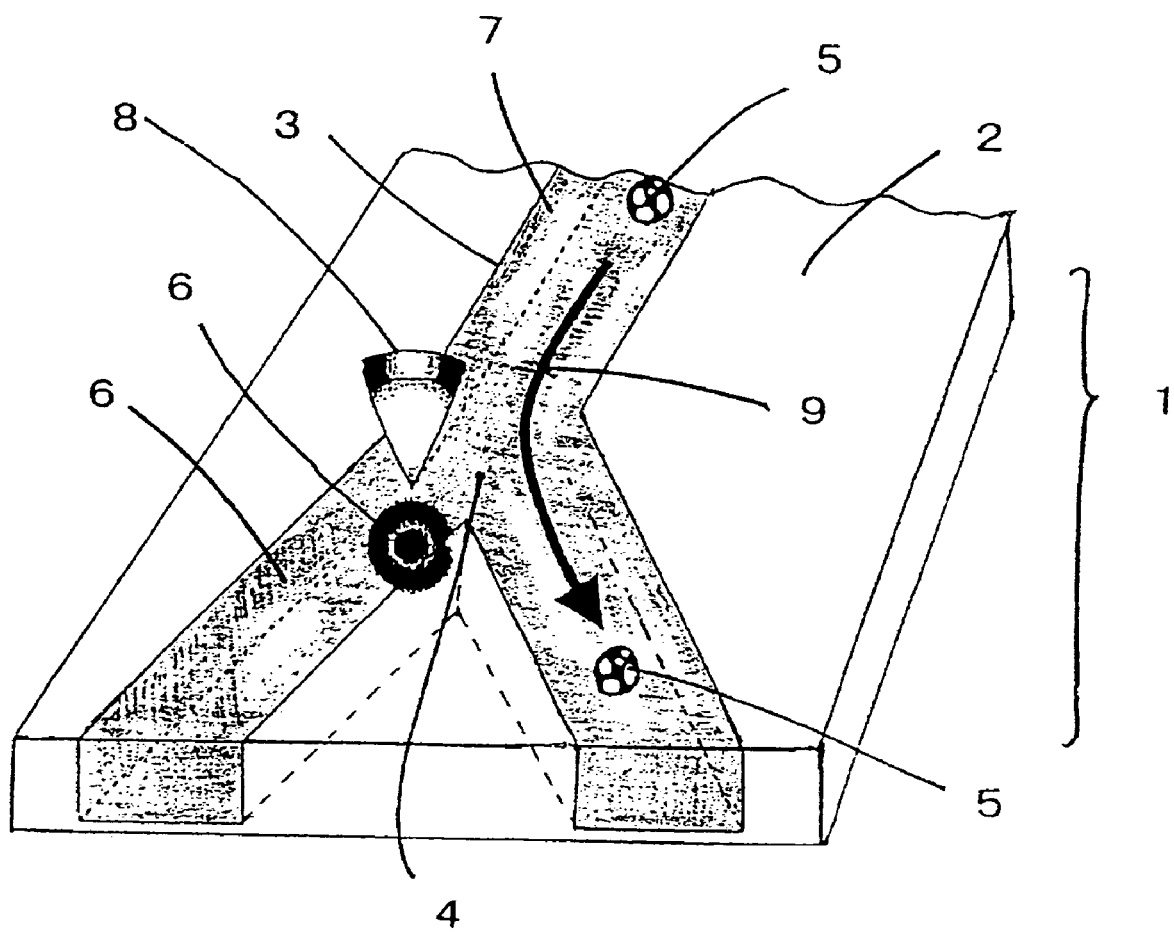
FIG. 1 is a conceptual diagram showing an example of a control method for the flow in a micro system of this invention, wherein numeral represents a micro system, numeral 2 represents a substrate, numeral 3 represents a minute flow passage, numeral 4 represents a branch point, numeral 5 represents a specimen, numeral 6 represents a sol-gel transitional substance (sol), numeral 6' represents a sol-gel transitional substance (gel), numeral 7 represents a fluid, numeral 8 represents an infrared laser, and numeral 9 represents a flow.

According to the method for controlling the flow in a micro system, for example as shown in FIG. 1, by providing a Y-shaped branch point (4) on a minute flow passage (3)

produced on a substrate (2) of a micro system (1), supplying a fluid (7) containing a specimen (5) and a sol-gel transitional substance (6), and applying stimulation on the downstream side by an infrared laser (8), or the like, the substance (6) is gelled (6') at the point of receiving the stimulation so that selective flow control of the fluid in one or a plurality of the minute flow passages (3). Moreover, by adjusting the position and the range of applying the stimulation of the infrared laser (a), or the like, the substance (6) is gelled (6') so as to form a wall on the minute flow passage (3) and narrow the width of the minute flow passage (3) so that the flow rate of the fluid (7) can be controlled. Therefore, according to the method for controlling the flow in a micro system of the invention of the present application, the sol-gel transitional substance (6) added in the fluid (7) provides the function of a minute valve for stopping the flow of the fluid (7) or adjusting the flow amount or the flow rate. Then, such a minute valve has the on-off function corresponding to the load or elimination of stimulation.

According to the method for controlling the flow in a micro system of the invention of the present application, the method for applying the stimulation can be selected according to the sol-gel transitional substance by the stimulation in the fluid as long as it is a method capable of controlling the flow in a fluid based on the above-mentioned principle and mechanism, and thus it may be any one. For example, in the case a sol-gel transitional substance by the temperature change is used, it can be the temperature, and in the case a sol-gel transitional substance by the voltage application is used, it can be the electricity. Additionally, pH, humidity change, light, or the like can be presented as the examples, however, the flow cannot be controlled partially according to those applying the stimulation over the entirety of the fluid so as to disable the on off control, and thus they are not preferable. That is, stimulation to be applied locally on the minute flow passage of the micro system is preferable. As such stimulation, temperature and electricity can be presented preferably. For example, in order to provide the temperature change, by directing an infrared laser, local heating can be enabled. Since a minute range can be heated rapidly by light concentration or a wide range can be heated by scanning, and thus it is preferable. As a method for locally applying the electric stimulation, an electrode, or the like can be provided at a desired point on the minute flow passage.

Furthermore, according to the method for controlling the flow in a micro system of the invention of the present application, the sol-gel transitional substance by the stimulation can be any one. Those which are not reactive with the other substances such as the specimen and the solvent supplied in the minute flow passage, nor do not influence them can be selected from various kinds of polymer compounds.

The sol-gel transition is the phenomenon generally observed in a polymer compound. A polymer exists in a solution in a colloid-like state, and this state is referred to as a sol. By gradually promoting the cross-link formation between the polymers, the polymer solution is changed form a liquid-like sol to a soft solid-like gel. As a substance to cause such sol-gel transition by stimulation, a methyl cellulose and a gelatin to cause the reversible sol-gel transition at about 55° C., and an N-isopropyl acrylamide to cause the sol-gel transition by application of about a 10 V/cm electric field can be presented preferably. A harmless methyl cellulose to have a stable Sol state at a room temperature can be presented particularly preferably.

According to the method for controlling the flow in a micro system of the invention of the present application, the concentration, the molecular weight, the cross-linking degree, or the like of the substance to have the sol-gel transition by the above-mentioned stimulation are not particularly limited as long as they are to the extent not co influence the other substances contained in the fluid, such as the specimen and the fluid without remarkably raising the viscosity of the fluid. According to the elaborate study of the inventors, one having a 0.1 to 1 wt % concentration of a viscosity of about 10 to 1,000 times as much as that of water is preferable. Of course, a concentration or a viscosity outside the ranges can be adopted according to the situation such as the case of analyzing the behavior of a highly viscous fluid, or the like.

In the method for controlling the flow in a micro system of the invention of the present application, as the micro system to be the subject, its shape, material, size, or the like are not particularly limited as long as it has a minute flow passage and a valve capable of locally stopping the flow of a fluid or adjusting the flow amount or the flow rate. The method for controlling the flow in a micro system of the invention of the present application can control the flow particularly in a minute flow passage accurately by stimulation such as temperature. Since the sol-gel transition of a substance in a fluid is applied, the change over speed can be shortened with a smaller flow passage size of about 1 to 500 µm. For example, with about a 10 µm flow passage size, changeover by a millisecond order speed can be enabled. Of course according to the method for controlling the flow in a micro system of the invention of the present application, the flow passage size on the micro system is not limited thereto.

Moreover, the invention of the present application also provides a micro system for controlling the flow of a fluid according to the above-mentioned method. Its shape, material, size, application, or the like of such a micro system are not particularly limited as long as it can stop the flow or adjust the flow amount or the flow rate by applying stimulation to a fluid with a sol-gel transitional substance added as mentioned above.

Furthermore, the invention of the present application also provides an apparatus containing such a micro system. For example, an analysis appliance capable of analyzing with a minute amount of a specimen, such as an electrochemical sensor and an electrophoresis apparatus, a chemical reactor enabling synthesis using a minute amount of a starting substance, or the like can be presented. Of course, the apparatus of the invention of the present application is not limited thereto, and as its application, configuration, size, material, or the like, various ones can be considered.

Hereinafter, with reference to the accompanied drawings, an example will be shown for explaining the embodiment of this invention further in detail. Of course this invention is not limited by the following example, and it is needless to say that various embodiments can be applied for the details.

EXAMPLE

Example 1

A minute flow passage (inlet: width 150 µm, depth 50 µm, outlet: width 75 µm, depth 50 µm) having a Y-shaped branch point as shown in FIG. 1 was produced on a silicon substrate.

A 1% by weight methyl cellulose solution containing fluorescent latex beads having a 1 µm diameter was supplied to the minute flow passage by a 1.5 µL/min.

Figure 2:
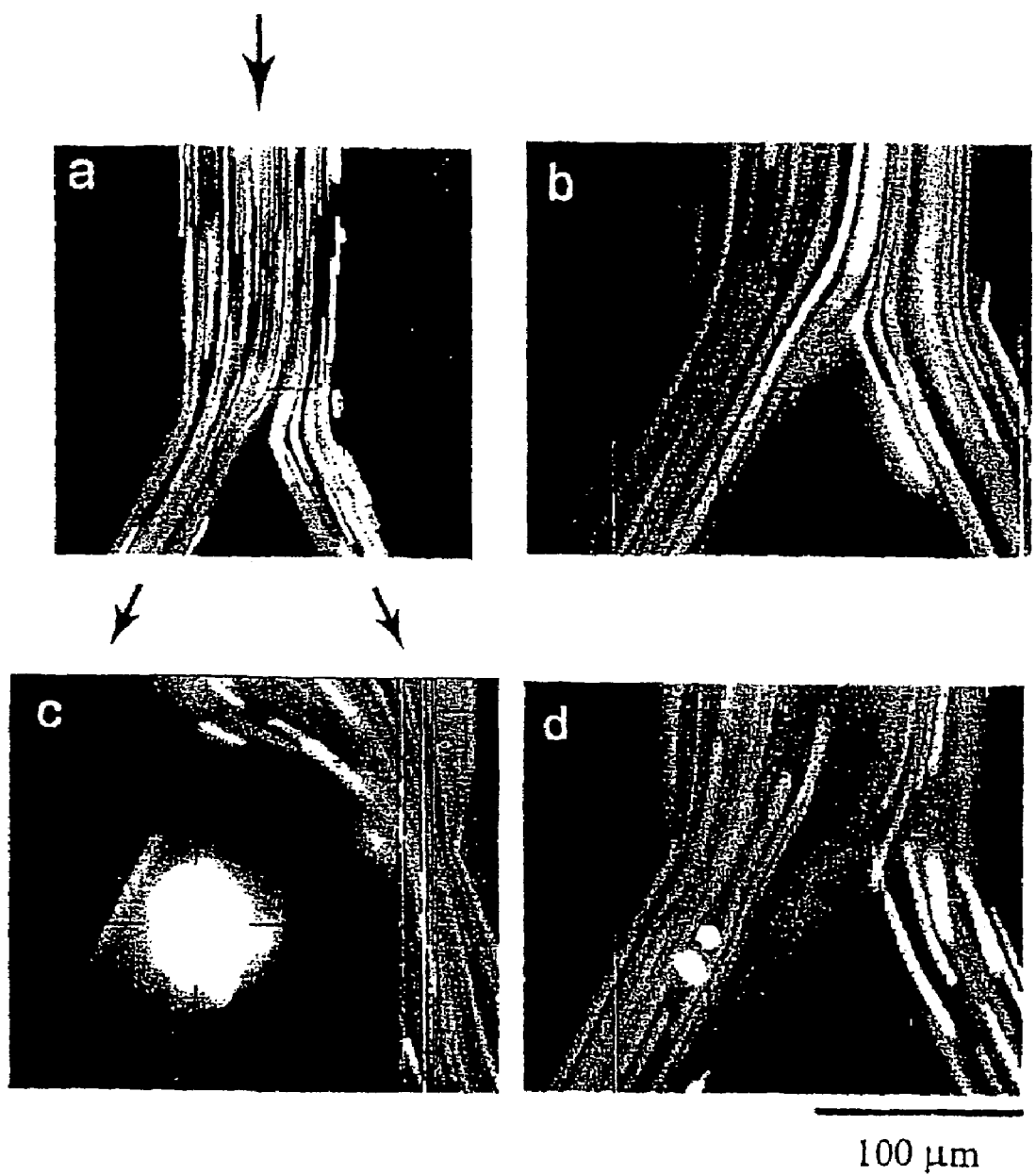
FIG. 2 is a figure showing a photographic image of a flow in a micro system having a Y-shaped flow passage in an embodiment of this invention, wherein symbol a represents the state before the infrared laser irradiation, symbol b represents the state before the infrared laser irradiation, symbol c represents the infrared laser irradiation, symbol d represents the infrared laser irradiation stoppage and the arrows represent the flow direction.

The flow of the fluid in the flow passage was photographed by a CCD camera (produced by Dage-MTI corp. CCD-300-RC). One frame (33 millisecond exposure) thereof is shown in FIGS. 2(a) and (b). According to FIGS. 2(a) and (b), the fluid flowing state in the Y-shaped minute flow passage was observed.

Next, an infrared laser having a 1,480 nm wavelength and a 0.8 W output was directed to the vicinity of the inlet of one of the minute flow passages on the downstream side of the branch point. The fluid flow in the minute flow passage at the time of directing the infrared laser was photographed so that gelation of the methyl cellulose in the minute flow passage on the side with the infrared laser irradiation so as to cause choking of the flow passage was confirmed (FIG. 2(c)).

Furthermore, by stopping the infrared laser irradiation, the gel of the methyl cellulose immediately became a sol so that the fluid flowing state in the entirety of the Y-shaped flow passage was observed again (FIG. 2(d)).

From the description above, the function of a methyl cellulose in the fluid as a high performance minute value to quickly respond to the infrared laser irradiation and to be used repeatedly was confirmed.

INDUSTRIAL APPLICABILITY

As heretofore explained in detail, according to this invention, a simple method for stopping the flow of a fluid in a micro system, or adjusting the flow amount or the flow rate without using a complicated valve structure can be provided.

The invention claimed is:

1. A method for controlling the flow of a fluid in a micro system which includes a minute flow passage, comprising the steps of adding a sol-gel transitional substance to a fluid flowing in the minute flow passage of the micro system, wherein the sol-gel transitional substance transforms from a sol state to a gel state upon application of a stimulation, and applying the stimulation to a point on the minute flow passage to transform the sol-gel transitional substance at the point in the minute flow passage from the sol state to the gel state, and wherein the sol-gel transitional substance is added to the fluid in an amount sufficient upon stimulation to transform the fluid to a gel state and to stop the flow of the fluid or to adjust the flow amount of the fluid or to adjust the flow rate of the fluid in the minute flow passage of the micro system.

2. The method for controlling the flow in the micro system according to claim 1, wherein the stimulation is a temperature change.

3. The method for controlling the flow in the micro system according to claim 2, wherein the temperature change is generated by a local irradiation of an infrared ray.

4. The method for controlling the flow in the micro system according to claim 3, wherein the sol-gel transitional substance is a methyl cellulose.

5. A micro system for controlling the flow of a fluid by the method according to claim 3, comprising a substrate containing a minute flow passage for a fluid and a device for applying a stimulation to a point on the minute flow passage, wherein the stimulation transforms a sol-gel transitional substance at the point in the minute flow passage from a sol state to a gel state.

6. An apparatus containing the micro system of claim 5.

7. The method for controlling the flow in the micro system according to claim 2, wherein the sol-gel transitional substance is a methyl cellulose.

8. A micro system for controlling the flow of a fluid by the method according to claim 2, comprising a substrate containing a minute flow passage for a fluid and a device for applying a stimulation to a point on the minute flow passage, wherein the stimulation transforms a sol-gel transitional substance at the point in the minute flow passage from a sol state to a gel state.

9. An apparatus containing the micro system of claim 8.

10. The method for controlling the flow in the micro system according to claim 1, wherein the stimulation is a voltage.

11. The method for controlling the flow in the micro system according to claim 10, wherein the sol-gel transitional substance is a methyl cellulose.

12. A micro system for controlling the flow of a fluid by the method according to claim 10, comprising a substrate containing a minute flow passage for a fluid and a device for applying a stimulation to a point on the minute flow passage, wherein the stimulation transforms a sol-gel transitional substance at the point in the minute flow passage from a sol state to a gel state.

13. An apparatus containing the micro system of claim 12.

14. The method for controlling the flow in the micro system according to claim 1, wherein the sol-gel transitional substance is a methyl cellulose.

15. A micro system for controlling the flow of a fluid by the method according to claim 14, comprising a substrate containing a minute flow passage for a fluid and a device for applying a stimulation to a point on the minute flow passage, wherein the stimulation transforms a sol-gel transitional substance at the point in the minute flow passage from a sol state to a gel state.

16. Previously An apparatus containing the micro system of claim 15.

17. A micro system for controlling the flow of a fluid by the method according to claim 1, comprising a substrate containing a minute flow passage for a fluid and a device for applying a stimulation to a point on the minute flow passage, wherein the stimulation transforms a sol-gel transitional substance at the point in the minute flow passage from a sol state to a gel state.

18. An apparatus containing the micro system of claim 17.

* * * * *